United States Patent Office 3,243,461
Patented Mar. 29, 1966

3,243,461
DI-(AMINOALKOXY)-TRIPHENYL
ETHANOL DERIVATIVES
Frank P. Palopoli, Glenside, Pa., and Dorsey E. Holt-kamp, Lebanon, and John L. Schaar, Ashland, Ohio, assignors to Richardson-Merrell Inc., New York, N.Y., a corporation of Delaware
No Drawing. Filed Jan. 25, 1965, Ser. No. 427,954
8 Claims. (Cl. 260—570)

This invention relates to new cemical compounds which are bis-aminoether derivatives of triphenylethanols. This application is a continuation-in-part of our application Serial No. 237,719 filed on November 14, 1962, and now abandoned.

The compounds of this invention have an absence of estrogenic activity. The compounds can be considered for therapeutic applications in the treatment of collagen diseases.

The compounds of the present invention are characterized by the formula:

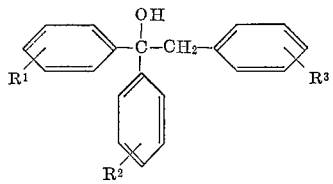

wherein $R^1$, $R^2$, and $R^3$ are selected from the group consisting of hydrogen, lower alkyl, lower alkoxy, halogen, trifluoromethyl and diethylaminoethoxy radicals, with the proviso that two of $R^1$, $R^2$, and $R^3$ are diethylaminoethoxy radicals; also the compounds of this invention include nontoxic acid addition salts and quaternary ammonium salts of the compounds of the above general formula.

Among the groups represented by $R^1$, $R^2$, and $R^3$ are methyl, ethyl, propyl, butyl, isobutyl, methoxy, ethoxy, propoxy, isobutoxy, chlorine bromine, fluorine and the like, e.g. iodine. Preferably the halogen has an atomic weight of from about 9 to 80. The alkyl groups generally contain between one and about four carbon atoms.

The novel compounds of the present invention can be prepared by the interaction of a substituted benzylmagnesium chloride of bromide or substituted benzyl alkali metal with an appropriately substituted benzophenone as illustrated by the following reaction scheme:

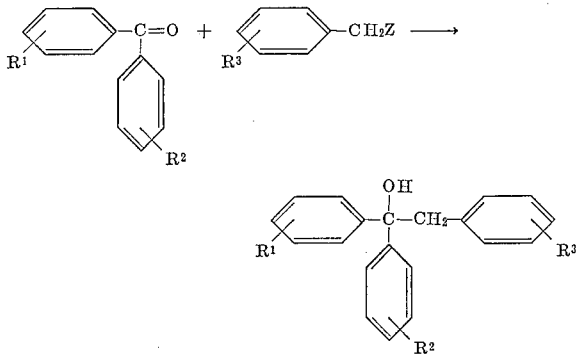

where Z is MgX or alkali metal and X is chlorine or bromine, and $R^1$, $R^2$, and $R^3$ are as defined above.

The reaction of a benzylmagnesium halide, or of a substituted benzylmagnesium halide, with the ketones of this invention is usually carried out at room temperature or slightly above in an anhydrous ether solvent. However, these reactions are operative at somewhat lower temperatures, for example, to −20° C., and also at higher temperatures, to about 150° C. These temperatures may be achieved by cooling the reaction mixture or by use of a higher boiling solvent such as tetrahydrofuran (boiling point 65 to 66° C.) or di-n-butyl ether (boiling point 142° C.). Another method generally used to achieve higher reaction temperatures is the preparation of the Grignard reagent in the usual manner in diethyl ether and then replacing the ether with a hydrocarbon solvent such as benzene (boiling point 80° C.) or toluene (boiling point 110° C.) for the subsequent reaction of the Grignard reagent with the ketones. Grignard reactions may also be carried out in tertiary amine solvents, such as dimethylaniline (boiling point 193° C.) and N-alkyl-morpholines.

As anti-inflammatory agents, the compounds of this invention are useful in alleviating the symptoms of such collagen diseases as arthritis and rheumatism and in the topical treatment of inflammation. The compounds also possess blood cholesterol lowering activity. A particular advantage of the compounds of this invention is their lack of estrogenic activity as can be evidenced by the absence of an increase in uterine weight of the animal after administration of the compounds.

The compounds can be employed orally and parenterally in doses ranging between about 25 milligrams and 2 to 4 grams daily depending on the condition and the treatment. For topical use the compounds can be incorporated into creams, ointments, or lotions in concentrations of 1 to 10 percent. In aerosol sprays, the concentration can be any order of about 0.05 to 1 percent. The compounds of the present inpention can be isolated and used in the form of their water-soluble salts of organic or inorganic acids such as citric acid, phosphoric acid, hydrochloric acid, propionic acid, tartaric acid, benzoic acid and the like. The compounds can also be isolated and used in the form of their quaternary salt with quaternizing agents such as lower alkyl halides, e.g., methyl bromide, ethyl bromide, and the like.

The following examples will serve to illustrate specific compounds of the present invention.

EXAMPLE I

*1,1-bis-[p-(β-diethylaminoethoxy)-phenyl]-
2-(p-tolyl)ethanol*

An ether solution containing 0.32 mole of p-methyl-benzylmagnesium bromide was added to 27.0 grams of 4,4′-bis-(β-diethylaminoethoxy)benzophenone in 250 milliliters of ether and the mixture stirred at room temperature for one hour. The complex was decomposed with a solution of ammonium chloride and the ether layer was removed and dried over magnesium sulfate. The ether was removed, leaving an oil which would not crystallize. After partial purification of the citrate salt, the regenerated free base crystallized readily. The product, 1,1-bis-[p-(β-diethylaminoethoxy)-phenyl] - 2 - (p-tolyl) ethanol, melted at 63 to 65° C. after recrystallization from petroleum ether (45 to 60° C.).

The 4,4′-bis-(β-diethylaminoethoxy)benzophenone was prepared by stirring a mixture of 107.1 grams (0.5) mole of 4,4′-dihydroxybenzophenone, 96.0 grams (2.4 moles) of sodium hydroxide pellets, 200 milliliters of water, 207.0 grams (1.2 moles) of β-diethylaminoethyl chloride hydrochloride, and 750 milliliters of toluene at reflux for eighteen hours. The reaction mixture was extracted successively with two 250 milliliter portions of 10 percent sodium hydroxide solution and two 250 milliliter portions of water. The organic layer was dried over magnesium sulfate, and the solvent was removed to yield the crude ketone. The product was purified by recrystallization of its dihydrochloride salt from butanone-methanol, yielding 141.3 grams (58.4 percent) melting at 146 to 148° C.

This compound exhibits anti-inflammatory activity and activity in decreasing blood cholesterol levels.

EXAMPLE II

1,1-bis-[p-(β-diethylaminoethoxy)-phenyl]-2-phenylethanol

When p-methylbenzylmagnesium bromide was replaced with benzylmagnesium chloride in the procedure of Example I, 1,1-bis-[p-(β-diethylaminoethoxy)phenyl]-2-phenylethanol was obtained, melting at 77 to 79° C. (from ether-petroleum ether).

This compound exhibits anti-inflammatory activity and activity in decreasing blood cholesterol levels.

EXAMPLE III

1,1-bis-[p-(β-diethylaminoethoxy)-phenyl]-2-(p-chlorophenyl)ethanol

When p-chlorobenzylmagnesium chloride was allowed to react with 4,4'-bis-(β-diethylaminoethoxy)-benzophenone according to the procedure of Example I, the product 1,1-bis-[p-(β-diethylaminoethoxy)phenyl]-2-(p-chlorophenyl) ethanol, melting at 57 to 59° C., was obtained.

This compound exhibits anti-inflammatory activity and activity in decreasing blood cholesterol levels.

EXAMPLE IV

1,1-bis-[p-(β-diethylaminoethoxy)-phenyl]-2-(p-methoxyphenyl)ethanol

When p-methoxybenzylmagnesium chloride was allowed to react with 4,4'-bis-(β-diethylaminoethoxy)-benzophenone according to the procedure of Example I, the product 1,1-bis-[p-(β-diethylaminoethoxy)phenyl]-2-(p-methoxyphenyl)ethanol was obtained.

EXAMPLE V

1,1-bis-[p-(β-diethylaminoethoxy)-phenyl]-2-(m-trifluoromethylphenyl)ethanol When m-trifluoromethylbenzylmagnesium chloride was allowed to react with 4,4'-bis-(β-diethylaminoethoxy)-benzophenone according to the procedure of Example I, the product 1,1-bis-[p-(β-diethylaminoethoxy)phenyl]-2-(m-trifluoromethylphenyl)ethanol was obtained.

EXAMPLE VI

1,2-bis-[p-(β-diethylaminoethoxy)-phenyl] 1-phenylethanol

To 25 grams of 1-[p-(β-diethylaminoethoxy)-phenyl]-1-phenyl-2-(p-hydroxyphenyl)ethanol in 200 milliliters of benzene was added 3.32 grams of sodium methoxide and the mixture was refluxed for 30 minutes. To this sodium salt was then added 21 grams of β-diethylaminoethyl chloride in 100 milliliters of toluene, and the mixture was heated under reflux for 3 hours. The salt was removed by filtration and the organic layer was washed three times with 10 percent sodium hydroxide solution and then with water. After drying over magnesium sulfate, the solvent was removed under vacuum. The residue was taken up in petroleum ether (boiling point 40 to 60° C.) and refrigerated. 1,2-bis-[p-(β-diethylaminoethoxy)phenyl]-1-phenylethanol was obtained as a white solid, melting point 79 to 81° C.

The 1-[p-(β-diethylaminoethoxy)-phenyl]-1-phenyl-2-(p-hydroxyphenyl)ethanol was prepared by low pressure hydrogenolysis of 1-[p-(β-diethylaminoethoxy)-phenyl]-1-phenyl-2-(p-benzyloxyphenyl)ethanol (melting point 93 to 95° C.), which was prepared by the addition of p-benzyloxybenzylmagnesium chloride to p-(β-diethylaminoethoxy)benzophenone in the usual manner.

This compound exhibits anti-inflammatory activity and activity in decreasing blood cholesterol levels.

What is claimed is:

1. Compounds of the formula:

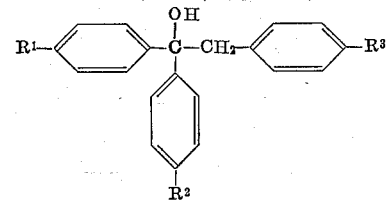

wherein $R^1$, $R^2$, and $R^3$ are selected from the group consisting of hydrogen, lower alkyl, lower alkoxy, halogen, trifluoromethyl and β-diethylaminoethoxy radicals, with the proviso that two of $R^1$, $R^2$, and $R^3$ are β-diethylaminoethoxy groups.

2. A compound of claim 1 wherein the halogen has an atomic weight of from 9 to 80.

3. 1,1-bis-[p-(β-diethylaminoethoxy)phenyl]-2-(p-tolyl)ethanol.

4. 1,1-bis-[p-(β-diethylaminoethoxy)phenyl]-2-phenylethanol.

5. 1,1-bis-[p-(β-diethylaminoethoxy)phenyl]-2-(p-chlorophenyl)ethanol.

6. 1,1-bis-[p-(β-diethylaminoethoxy)phenyl]-2-(p-methoxyphenyl)ethanol.

7. 1,1-bis-[p-(β-diethylaminoethoxy)phenyl]-2-(m-trifluoromethylphenyl)ethanol.

8. 1,2-bis-[p-(β-diethylaminoethoxy)phenyl]-1-phenylethanol.

References Cited by the Examiner

UNITED STATES PATENTS 2,914,562  11/1959  Allen et al. _____ 260—570
2,971,001   2/1961  Palopoli et al. ____ 260—570 X CHARLES B. PARKER, *Primary Examiner.*

ROBERT V. HINES, *Assistant Examiner.*